United States Patent [19]

Delage et al.

[11] Patent Number: 4,892,573

[45] Date of Patent: Jan. 9, 1990

[54] PROCESS AND DEVICE FOR MELTING GLASS

[75] Inventors: Robert Delage, Ribecourt; Marcel Cadier, Velizy-Villacoublay; Jacques Boillet, Compiegne, all of France

[73] Assignee: Saint-Gobain Vitrage, Courbevoie, France

[21] Appl. No.: 106,863

[22] Filed: Oct. 13, 1987

[30] Foreign Application Priority Data

Oct. 13, 1986 [FR] France ................. 86 14172

[51] Int. Cl.⁴ .............................. C03B 5/187
[52] U.S. Cl. ........................ 65/179; 65/135; 65/178
[58] Field of Search ............. 65/178, 179, 135; 366/261, 241, 277, 248, 325, 147

[56] References Cited

U.S. PATENT DOCUMENTS 1,156,851 10/1915 Pfouts ....................... 366/325
3,909,227 9/1975 Dickinson ................. 65/134
4,047,918 9/1977 Heithoff .................... 65/178
4,113,460 9/1978 Penberthy ................. 65/178
4,422,770 12/1983 Geible ...................... 366/248

FOREIGN PATENT DOCUMENTS 792996 6/1934 France .
55-165136 3/1981 Japan .

Primary Examiner—Kenneth M. Schor
Attorney, Agent, or Firm—Oblon, Spivak, McClelland, Maier & Neustadt

[57] ABSTRACT

The device pursuant to the invention comprises means for agitation composed of at least one horizontal agitator formed from a series of essentially vertical loops extending over the entire width of the bath near the collar between the refining zone and the homogenization zone, with the horizontal agitator being moved by means that produce an elliptical motion in the horizontal plane.

13 Claims, 5 Drawing Sheets

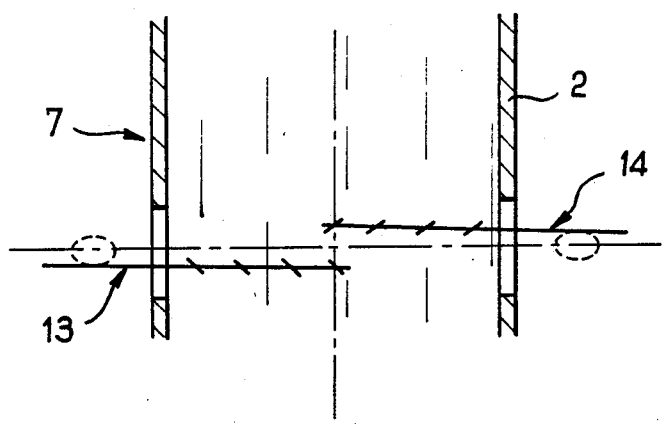
FIG_3
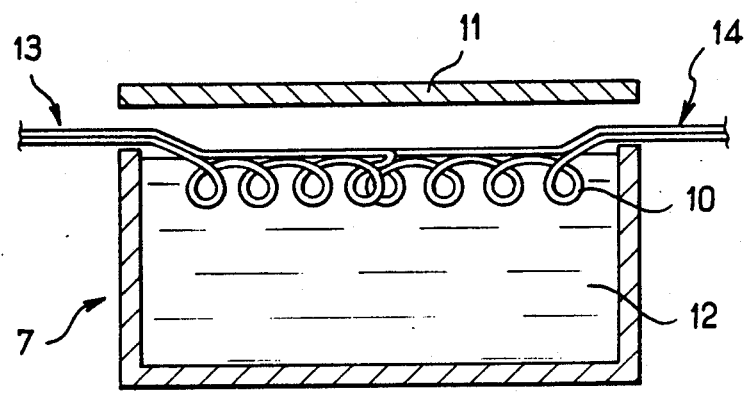
FIG_4

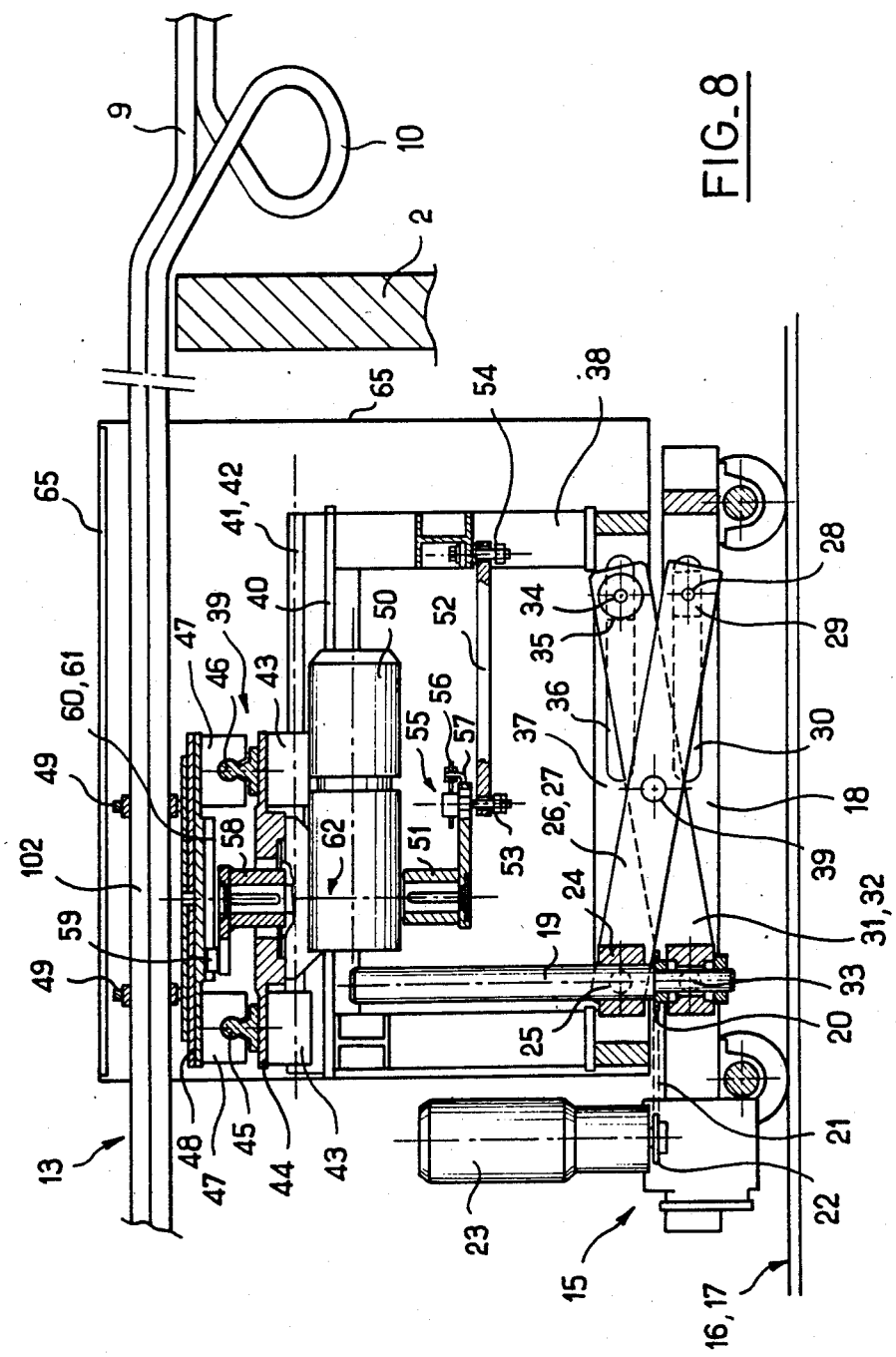
FIG_8

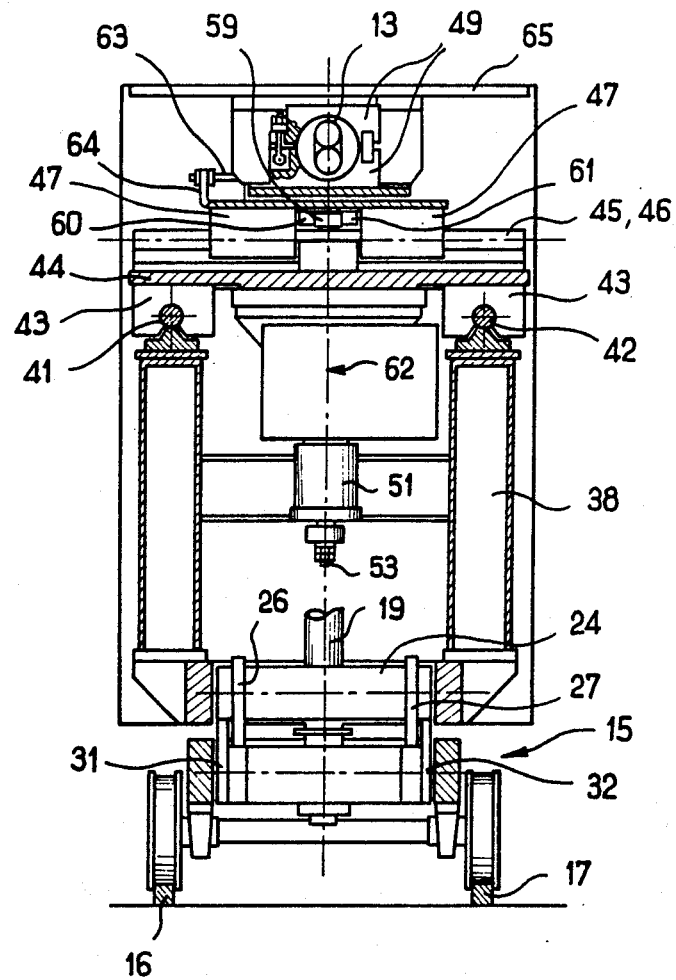
FIG_9

PROCESS AND DEVICE FOR MELTING GLASS

BACKGROUND OF THE INVENTION

1. Field of the invention

This invention concerns the manufacture of plate glass by flotation and especially the preparation by melting, refining, and homogenization of the glass composition to be poured on the flotation bath.

2. Background of the Prior Art

One of the problems encountered in the manufacture of plate glass by flotation is the homogenization of the glass composition suitable for being poured onto the molten metal bath of the flotation furnace, in particular when the flotation furnace operates with taps close to the maximum capacity, especially to produce colored glass. When the homogenization is not very good, streaks and waves are observed in the manufactured pane of glass. The problem of homogenization is further accentuated during changeovers from one type of glass to another, i.e., during a change of color. Poor homogenization of the poured glass composition substantially increases the time of changeover during which the glass is transformed into cullet.

Several solutions have already been proposed to solve this problem of homogenization of the glass composition to be poured. Thus, it has been proposed to introduce mechanical or thermal baffles into the melting tank to force the flow of glass to pass through openings deep in the glass bath.

It has also been proposed to produce a mixing of molten glass by agitators. For example, in the publication of the French Certificate of Addition 2 287 423, it has been proposed to mix the molten glass using vertical agitators traversing the arch of the furnace.

This device, effective as far as the homogenization of the glass is concerned, is complicated to implement. Its maintenance is also difficult since the mechanical parts of which it is composed operate above the arch of the furnace and accordingly at high temperature, and deteriorate rapidly.

In the publication of the French Patent FR-A-2 213 914, a process is described by which the flow of molten glass is modified in the refining region, and starting from it toward the working region, also called the homogenization zone or live coal zone, to improve the homogeneity of the glass by causing a cooling liquid to flow in one or more pipes that extend substantially horizontally across at least a portion of the tank in the upper region of the molten glass, at the junction of the refining region with the working region, or close to it, and causing a transverse horizontal displacement of the molten glass in the glass stream by displacement according to a back and forth motion of the pipe or pipes. The effectiveness of this device is not entirely satisfactory, and the changeover times in particular remain long.

In the publication of French Patent FR-A-792 996, horizontal agitation is also described, using an arm provided with several fingers of cylindrical shape. The efficacy of this device is not entirely satisfactory.

None of these known devices provide complete satisfaction. They are difficult to utilize or have dubious effectiveness.

SUMMARY OF THE INVENTION

This invention proposes a process and a device for horizontal agitation that obviates the drawbacks cited, particularly in being easy to implement and in permitting the reduction of the changeover times during the changeover from one glass to another.

Pursuant to the process of the invention, in a furnace for melting glass with a tank having a melting zone, a refining zone, and a homogenization or live coal zone separated from the refining zone by an intermediate zone, and which generally has the form of a constriction or collar, at least the upper portion of the molten glass composition in the intermediate zone or just beside it is agitated, essentially over the entire width of the tank, by horizontal agitation conforming to an elliptical motion, by at least one agitator formed of a series of essentially vertical loops.

The device pursuant to the invention comprises furnace for melting glass with a tank having a melting zone, a refining zone, and a homogenization zone separated from the refining zone by an intermediate zone, which is generally in the form of a collar, and of means of agitation of the molten glass composition in the region of the intermediate zone or just beside it, with these means being composed of at least one horizontal agitator extending essentially over the entire width of the basin, means providing an elliptical motion at each point of the agitator in a horizontal plane, with the agitator being formed of a series of essentially vertical loops, which can beneficially be surmounted by a horizontal tube. In a preferred implementation, the plane of each loop is inclined relative to the shaft of the agitator and of the horizontal tube. Different geometric forms of loops can be suitable, the choice of which depends on the efficiency needed for the agitation.

Pursuant to a characteristic of the invention, the agitator is formed of a series of tubes that form a continuous pipe in which a cooling fluid flows, for example water.

The means providing the agitator with an elliptical motion are located outside of the furnace. For example, they comprise a cross table as described in further detail below.

Pursuant to an implementation of the device of the invention, it comprises two similar agitators whose motion is synchronized, each of them operating essentially on half of the molten glass bath at its location, and each being mounted on one side of the furnace. The two agitators are beneficially offset relative to one another to avoid collisions in case of improper operation of the synchronizing system. It is also necessary to provide for an overlap of at least a portion of the active elements of the two agitators, so as not to leave a central, unmixed zone. This implementation with two agitators, although it requires synchronization for their operation, is easier to install and remove if necessary.

The agitator (or the two agitators) can be partly or totally immersed in the bath. In the latter case, when it carries a horizontal tube, it forms a baffle for the upper flow of glass.

To facilitate the handling of the agitators, they are beneficially mounted on a carriage moving on rails perpendicular to the axis of the furnace.

Other advantages and characteristics of the invention will appear in the following description of examples of implementation of the device pursuant to the invention.

BRIEF DESCRIPTION OF THE DRAWINGS

FIG. 3 represents a plan view of the collar of a melting tank equipped with two agitators slightly offset relative to one another.

FIG. 4 is a cross sectional view of the tank equipped with two agitators, shown in FIG. 3.

FIG. 8 represents a front view of the mechanism providing an agitator with its elliptical motion.

FIG. 9 is a side view of the mechanism of FIG. 8.

DETAILED DESCRIPTION OF THE INVENTION

Figure 1:
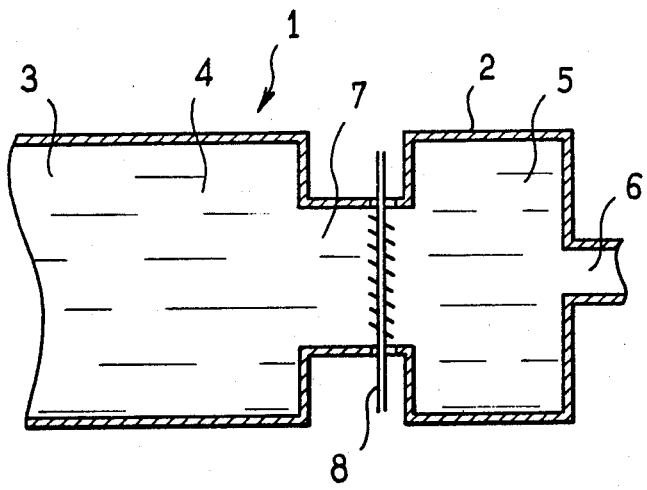
FIG. 1 is a plan view of the melting tank equipped with a loop agitator with elliptical motion.

FIG. 1 represents a plan view of the melting tank of the furnace comprising refractory walls 2 with an upstream compartment 3 in which the melting of the glass composition is carried out, followed by a compartment 4 in which the refining of the glass is carried out, a downstream compartment 5 in which the final homogenization is carried out, specifically at a molten glass composition temperature preceding the outlet channel 6 and the pouring. Between the homogenization compartment 5 and the refining compartment 4, the tank has a constriction or collar 7. In the downstream section of this collar, there is a horizontal agitator 8 extending across it, whose active portion located in the collar is formed of a horizontal tube 9 surmounted by a series of loops 10, whose plane is inclined relative to the axis of the horizontal tube. The entire agitator is formed of a series of tubes forming a pipe through which water flows for cooling. The agitator traverses the side walls 2 of the collar 7, and it is connected to the means described below that impart to it an elliptical agitation motion in the horizontal plane.

Figure 2:
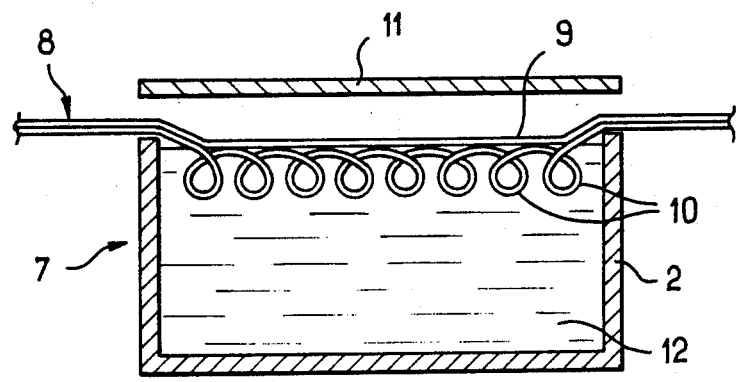
FIG. 2 is a transverse cross section of FIG. 1 at the collar.

In FIG. 2, the agitator is shown in a working position in the collar 7 below the arch 11 of the furnace. The loops 10 are totally immersed in the molten glass 12. The horizontal tube 9 in this case is partially immersed in the glass, so that it acts as a baffle for the top flow of glass.

In FIG. 3, two agitators 13, 14 operating in phase in the version with two agitators are shown schematically.

The axis of each agitator is slightly inclined in different directions relative to the perpendicular to the furnace. This avoids the extremities of the agitators colliding in case of poor synchronization of the elliptical motion of the two agitators.

The dotted lines indicate the horizontal elliptical path of the points at which the agitators are attached to the drive.

FIG. 4 shows the section of the tank with the two loop agitators 13, 14, whose extremities overlap, going beyond the axis of the furnace.

Figure 5:
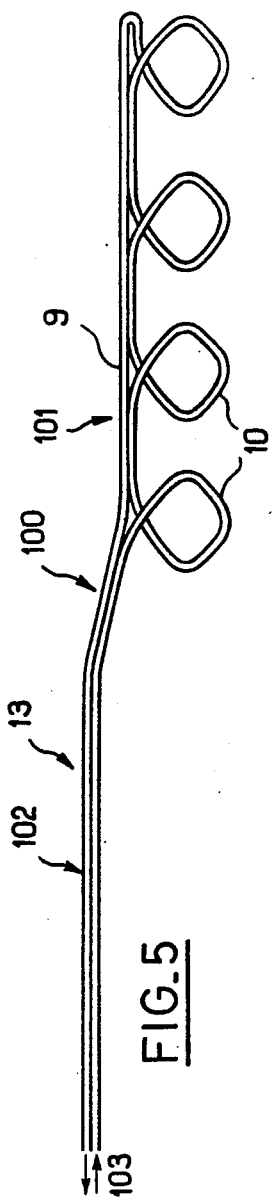
FIG. 5 represents the loop agitator used in the version with two agitators.
Figure 6:
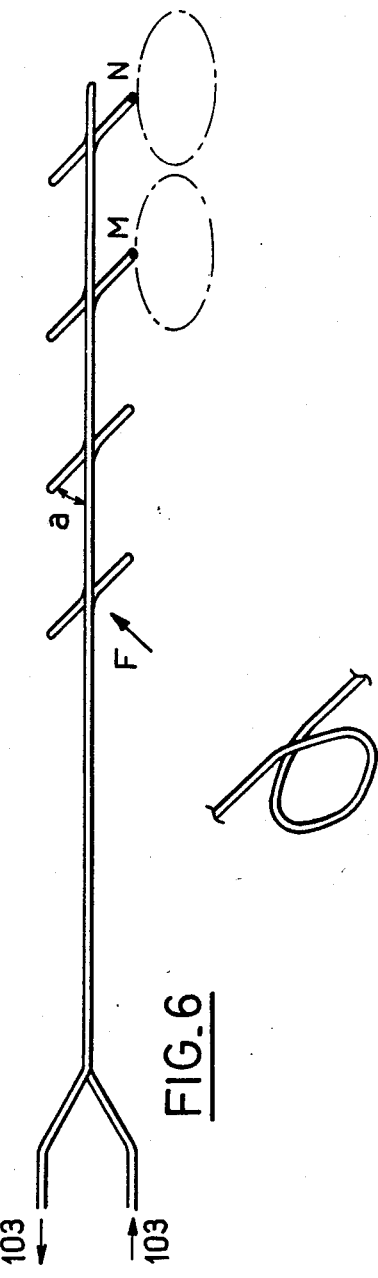
FIG. 6 represents a top view of the agitator of FIG. 5.

FIGS. 5 and 6 show an example of a loop agitator. This agitator is formed of a succession of tubes forming a continuous pipe whose lower section has four loops 10, at regular intervals, while the upper section is a horizontal tube 9. The number of loops and their dimensions can naturally vary, depending on the dimensions of the collar.

Figure 7:
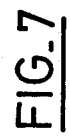
FIG. 7 shows a loop of the agitator in plan view.

As shown in FIG. 7, which is a view in the direction of F in FIG. 6, in the embodiment described, each loop shows the approximate shape of an ellipse whose large axis can vary between approximately 300 and 500 mm, and whose small axis can vary between approximately 150 and 400 mm. The loops are formed of a tube whose diameter is approximately 40 mm.

In the pipe, i.e., in the entire agitator, circulates a liquid refrigerant, generally water. The flow rate of the water is approximately 10 to 20m$^3$/hour.

The agitator has a bend 100 between the section 101 intended to be placed in the collar, and the section 102 intended to be located outside of it, which is supported by the drive, not shown here, and described below.

This bend permits a partial or total immersion of the active portion of the agitator in the molten glass bath, while permitting the agitator to pass across the refractory wall of the collar, above the level of the glass.

The vertical plane of the loops is inclined relative to the axis of the upper tube. The angle of inclination a can vary, depending on the dimensions of the loops. It can be approximately 30 degrees.

The agitator is cooled during its use by the circulation of water 103 which passes into the loops 10 before returning through the tube 9.

The device imparting a motion of elliptical shape in the horizontal plane to each point of an agitator, as shown for the points M and N, is described in connection with FIGS. 8 and 9.

The device is mounted on a carriage 15, which in turn is mounted on two rails 16, 17 perpendicular to the axis of the furnace, to facilitate the placement of the agitator and its removal. On the chassis 18 of the carriage is mounted the end of a vertical screw 19 having a sprocket 20, which puts it into rotation, itself being driven through a chain 21 by a sprocket 22 mounted at the end of the shaft of an electric motor 23. On the screw 19 is mounted a nut 24, connected through shafts 25 to the end of two connecting rods 26, 27.

The other ends of the two connecting rods are supported by a shaft 28, integral with a slide block 29 sliding in a window 30 in the chassis 18. Two other connecting rods 31, 32, are supported on the one hand by a shaft 33 fastened to the chassis 18, and on the other hand, to a shaft 34 integral with a sliding block 35 sliding in a window 36 of a lifting platform 37, comprising the lower section of a frame 38. The lifting platform 37 is raised by the action of the electric motor 23, through the connecting rods 26, 27, 31, 32, all four of which are linked around a transverse and horizontal shaft 39. The stroke length of the lifting platform 37 and of the frame 38 is approximately 500 to 600 mm. This stroke is used to make the loops 10 of the agitator pass through the opening of the refractory wall 2 of the collar, and then to immerse the agitator in the molten glass bath. On the upper portion of the frame 38 is mounted a cross table 39. This table has a pedestal 40 carrying two rails 41, 42 perpendicular to the axis of the furnace. On these rails run four blocks 43 that carry a plate 44, which itself carries two rails 45, 46 perpendicular to the first rails 41, 42, i.e., oriented essentially along the axis of the furnace. On these rails slide four other blocks 47 supporting a plate 48, on which is fastened the extremity 102 of the agitator 13, using locking clamps 49.

Beneath the plate 44 is permanently fastened an electric motor 50. The output of the motor 50 is equipped with a rotary arm 51 connected to a horizontal connecting rod 52 by a vertical shaft 53. The other end of the connecting rod 52 is linked around a vertical shaft 54 carried by the frame 38. The rotation of the motor 50 causes the rotation of the arm 51 around the shaft 53 and the displacement of the table 39 along the rails 45, 46.

The stroke length of this displacement can be modified by varying the spacing of the shaft 53 from the motor shaft 62 using a system 55 equipped with an adjusting pin 56 carried by an arm 57 located at the end of the rotary arm 51.

The stroke length of the table can be varied, for example, from 350 to 450 mm. The upper output of the drive shaft is connected to another rotary arm 58, whose end carries a slider 59 that is placed between two slide bars 60, 61, integral with the plate 48.

The distance of the slider relative to the axis 62 of the drive shaft can be adjusted using a threaded shaft 63 carried by an arm 64.

This assembly permits a stroke length of the table in the direction of the axis of the furnace of approximately 150 to 300 mm. These stroke lengths are given by way of illustration, and they can be varied within a very extended range of elliptical trajectories.

The device is covered by a guard panel 65.

The rate of rotation of the agitator, i.e., the number of elliptical paths executed by a point of the agitator, can vary from 2 to 10 per minute, for example. The amount of glass mixed in the example of embodiment, is above 1 m$^3$ on each rotation.

The effectiveness of the device pursuant to the invention can be demonstrated specifically by the fact that this device permits a reduction of the time of changeover from one glass to another of several hours compared with a fixed agitator driven by a simple back and forth motion.

What is claimed as new and desired to be secured by Letters Patent of the United States is:

1. A device for melting glass before pouring onto a float bath, comprising a melting furnace for the tank having means defining zones which are a melting zone, a refining zone, and a homogenization zone separated from the refining zone by an intermediate zone, and means for agitation of the molten glass in the tank, wherein the means for agitation are located in the intermediate zone and are comprised of (1) at least one horizontally extending agitator formed of a series of essentially vertically downward extending loops and horizontally extending means horizontally connecting said loops, with said loops extending over essentially the entire width of the tank, and are further comprised of (2) means imparting to each point of the agitator an elliptical motion in a horizontal plane the imparting means being capable of varying the axes of the ellipse traversed by said each point of the agitator.

2. Device pursuant to claim 1, wherein the loops are surmounted by a horizontal tube.

3. Device pursuant to claim 2, wherein the horizontal tube surmounting the loops is partly immersed in the molten glass and forms a baffle for the top flow of glass.

4. Device pursuant to claim 1, wherein the plane of each loop is inclined relative to the axis of the agitator.

5. Device pursuant to claim 1, which comprises two horizontal agitators, each of them operating essentially on half of the molten glass bath and each being mounted on one side of the furnace.

6. Device pursuant to claim 5, wherein the elliptical motion of the two agitators is synchronized.

7. Device pursuant to claim 5, wherein the two agitators are slightly offset relative to one another, with their extremities overlapping.

8. Device pursuant to claim 1, wherein the agitator is formed of a series of tubes forming a continuous pipe in which flows a cooling liquid, preferably water.

9. Device pursuant to claim 1, wherein the means imparting the elliptical motion to the agitator comprises a cross table.

10. Device pursuant to claim 1, which includes means for adjusting the elliptical motion.

11. Device pursuant to claim 1, wherein the agitator is mounted on a frame with a lifting platform.

12. Device pursuant to claim 1, wherein the agitator is mounted on a carriage that can move in a transverse direction relative to the axis of the furnace.

13. Device pursuant to claim 1, wherein the agitator has a bend such that the active portion of the agitator is located at a level below that of the portion of the agitator outside of the furnace.

* * * * *